United States Patent
Marasco

(10) Patent No.: US 6,978,974 B1
(45) Date of Patent: Dec. 27, 2005

(54) COLLAPSIBLE PINATA SUPPORT ASSEMBLY

(76) Inventor: Anthony C. Marasco, 8536 Dalewood Ave., Pico Rivera, CA (US) 90660

( * ) Notice: Subject to any disclaimer, the term of this patent is extended or adjusted under 35 U.S.C. 154(b) by 0 days.

(21) Appl. No.: 10/899,404

(22) Filed: Jul. 27, 2004

(51) Int. Cl.[7] .............................................. F16M 11/00
(52) U.S. Cl. ............................. 248/124.1; 248/125.8; 473/429; 473/430
(58) Field of Search ........................ 248/125.8, 124.1, 248/124.2, 161, 910; 473/418, 429, 430; 212/179

(56) References Cited

U.S. PATENT DOCUMENTS

| | | | |
|---|---|---|---|
| 2,338,317 A | | 1/1944 | Cortes |
| 2,772,882 A | * | 12/1956 | Anson ........................ 473/429 |
| 3,940,132 A | * | 2/1976 | Lopatto, III ................ 473/418 |
| 4,462,599 A | * | 7/1984 | Brown ....................... 473/430 |
| 4,832,337 A | | 5/1989 | Estrada |
| 5,242,308 A | | 9/1993 | Estrada |
| 5,460,353 A | * | 10/1995 | Rittenhouse ................... 256/1 |
| 5,622,237 A | | 4/1997 | Moldow |
| 5,725,112 A | * | 3/1998 | Thorby ........................ 212/180 |
| 5,873,552 A | * | 2/1999 | Skarp .......................... 248/161 |
| 6,099,419 A | * | 8/2000 | Incaudo et al. ............. 473/429 |
| 6,354,904 B1 | | 3/2002 | Grey et al. |
| 6,412,736 B1 | | 7/2002 | Zaragoza |
| 6,685,146 B1 | * | 2/2004 | Sanchez, Jr. ............. 248/125.7 |
| 2003/0230692 A1 | * | 12/2003 | Davis et al. ............. 248/346.2 |

* cited by examiner

Primary Examiner—Ramon O Ramirez

(57) ABSTRACT

A collapsible piñata support assembly includes a base that has a top wall having has a fill opening extending therethrough. A sleeve is mounted in the top wall. A telescoping pole has a top end and a bottom end that is removably extendable into the sleeve. An arm has a first end and a second end. The arm has a wall extending therein for receiving the top end of the pole. The arm has a first positioned between the wall and the first end of the arm and a second orifice positioned adjacent to the second end of the arm. The tether extends through the arm such that a hanging end extends outwardly of the second orifice and a pulling end extends outwardly of the first orifice. A fluid may be positioned within the base and a piñata may be selectively attached to the hanging end of the tether.

13 Claims, 5 Drawing Sheets

COLLAPSIBLE PINATA SUPPORT ASSEMBLY

BACKGROUND OF THE INVENTION

1. Field of the Invention

The present invention relates to piñata support devices and more particularly pertains to a new piñata support device for supporting a piñata in an adjustable manner with a device that easily transportable 2. Description of the Prior Art The use of piñata support devices is known in the prior art. U.S. Pat. No. 6,413,736 describes a collapsible piñata hoist that includes a pair of weights attached to horizontal posts from which a vertical mounting extends upwardly. Another type of hanging support device is U.S. Pat. No. 2,338,317 having a pulley assembly attached to a vertical support for lifting heavy loads upwardly off of a ground surface.

While these devices fulfill their respective, particular objectives and requirements, the need remains for a device that is more collapsible than previous devices for easier transportation and is more effective and efficient in its usage.

SUMMARY OF THE INVENTION

The present invention meets the needs presented above by generally comprising a base that has a bottom wall, a top wall, a back wall, a first side wall, a second side wall and a front wall. The top wall has a fill opening extending therethrough into an interior of the base. A sleeve is mounted in the top wall. An elongated pole has a bottom end and a top end. The bottom end is removably extendable into the sleeve such that the pole is vertically orientated. The pole includes a plurality of sections selectively retractable with respect to each other such that the pole is telescoping. An arm has a first end and a second end. The arm is substantially hollow. The arm has a well extending therein for selectively receiving the top end of the pole such that the arm is orientated generally perpendicular to the pole. The arm has a first orifice and a second orifice extending through a bottom side of the arm. The first orifice is positioned between the well and the first end of the arm. The second orifice is positioned adjacent to the second end of the arm. A tether has a pulling end and a hanging end. The tether extends through the arm such that the hanging end extends outwardly of the second orifice and the pulling end extends outwardly of the first orifice. A fluid may be positioned within the base for providing added weight to the base and a piñata may be selectively attached to the hanging end of the tether.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
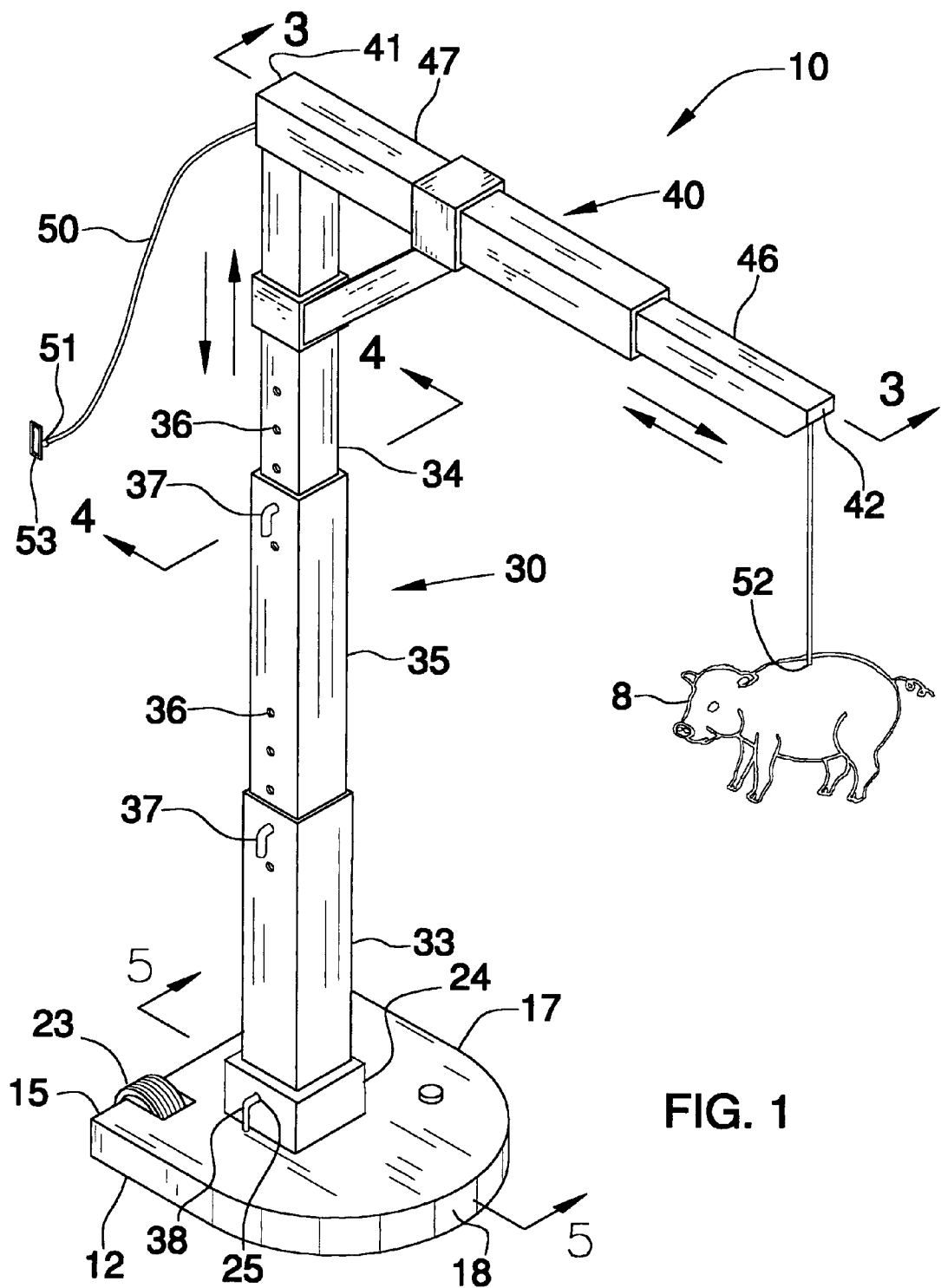
FIG. 1 is a perspective in use view of a collapsible piñata support assembly according to the present invention.

With reference now to the drawings, and in particular to FIGS. 1 through 5 thereof, a new piñata support device embodying the principles and concepts of the present invention and generally designated by the reference numeral 10 will be described.

As best illustrated in FIGS. 1 through 5, the collapsible piñata support assembly 10 generally comprises a base 12 that has a bottom wall 13, a top wall 14, a back wall 15, a first side wall 16, a second side wall 17 and a front wall 18. The top wall 14 has a fill opening 19 extending therethrough into an interior of the base 12. A cover 20 is immovably positioned over the fill opening 19. The bottom wall 15 has a drain opening 21 extending therethrough. A drain plug 22 is removably positioned over the drain opening 21. The front wall 18 is arcuate from the first side wall 16 to the second side wall 17 to remove any sharp edges on which a child could be hurt. The base 12 preferably comprises a rigid plastic material to lower weight for transportation. A pair of wheels 23 is rotatably mounted in the back wall 15. The wheels 23 have an axis of rotation that is orientated parallel to a line extending along the back wall 23. A sleeve 24 is mounted in the top wall 14. The sleeve 24 has an aperture 25 extending therethrough. The sleeve 24 is positioned between the first 16 and second 17 side walls and nearer the back wall 15 than the front wall 18.

An elongated pole 30 has a bottom end 31 and a top end 32. The bottom end 31 is removably extendable into the sleeve 24 such that the pole 30 is vertically orientated. The pole 30 includes a plurality of sections selectively retractable with respect to each other so that the pole 30 is telescoping. The plurality of sections at least includes a bottom section 33, a top section 34 and a middle section 35. The top section 34 is removably extendable into the middle section 35, and the middle section 35 is removably extendable into the bottom section 33. The bottom section 33 has shorter height than the middle section 35, and the middle section 35 has a shorter height than the top section 34. Each of the sections has a plurality of holes 36 extending therethrough. The holes 36 in each of the sections are selectively alignable with holes 36 in an adjacent one of the sections. A plurality of pins 37 to removably extendable through aligned ones of the boles 36 such that the pole 30 is secured at a selected height. A fastener, 38 is removably extendable through the aperture 25 and into the pole 30 for releasably securing the pole 30 in the sleeve 24. The pole 30 has a substantially rectangular cross-section taken transversely to a longitudinal axis of the pole 30. This prevents the sections from rotating with respect to each other.

Figure 2:
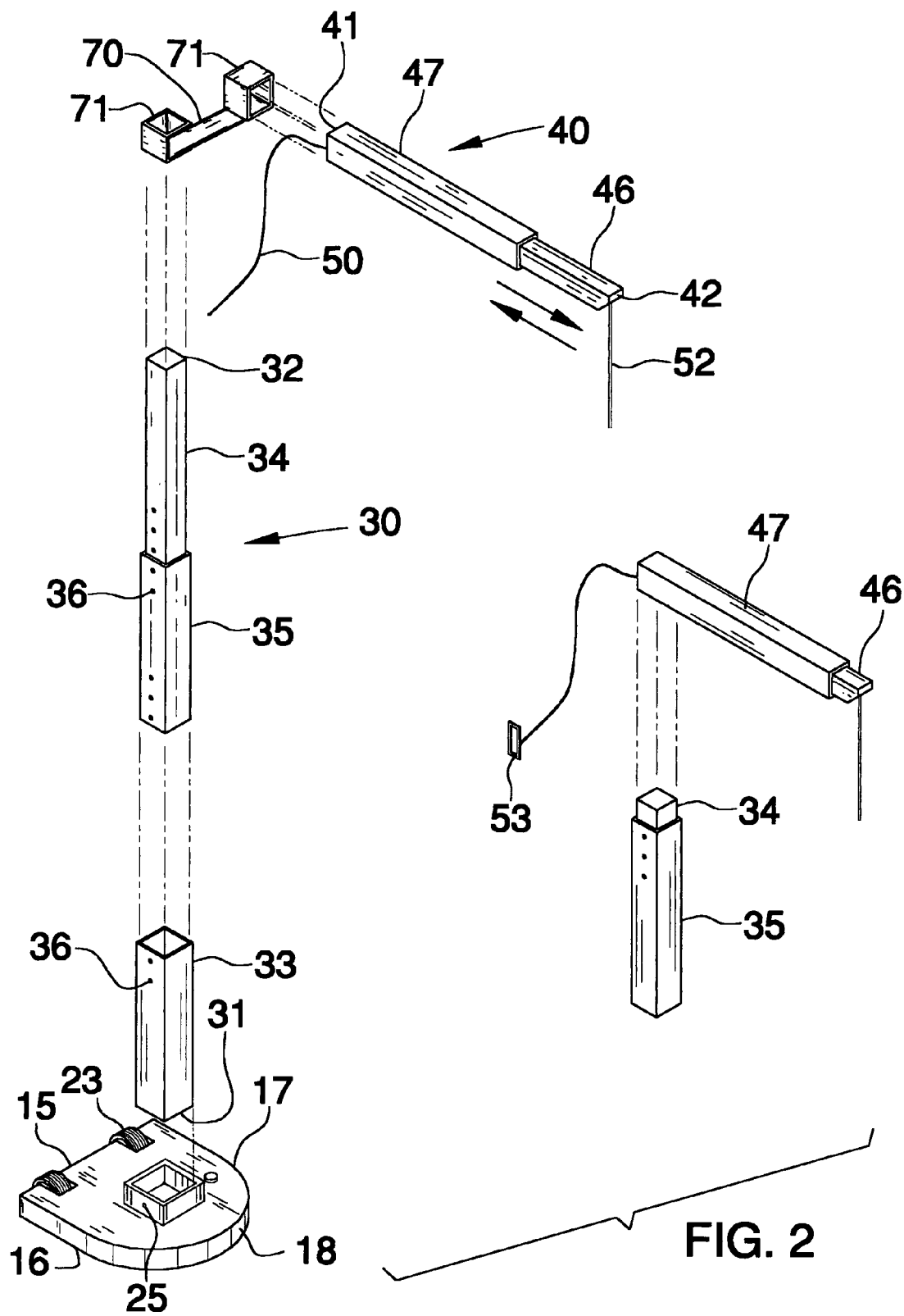
FIG. 2 is a perspective view of the present invention.
Figure 3:
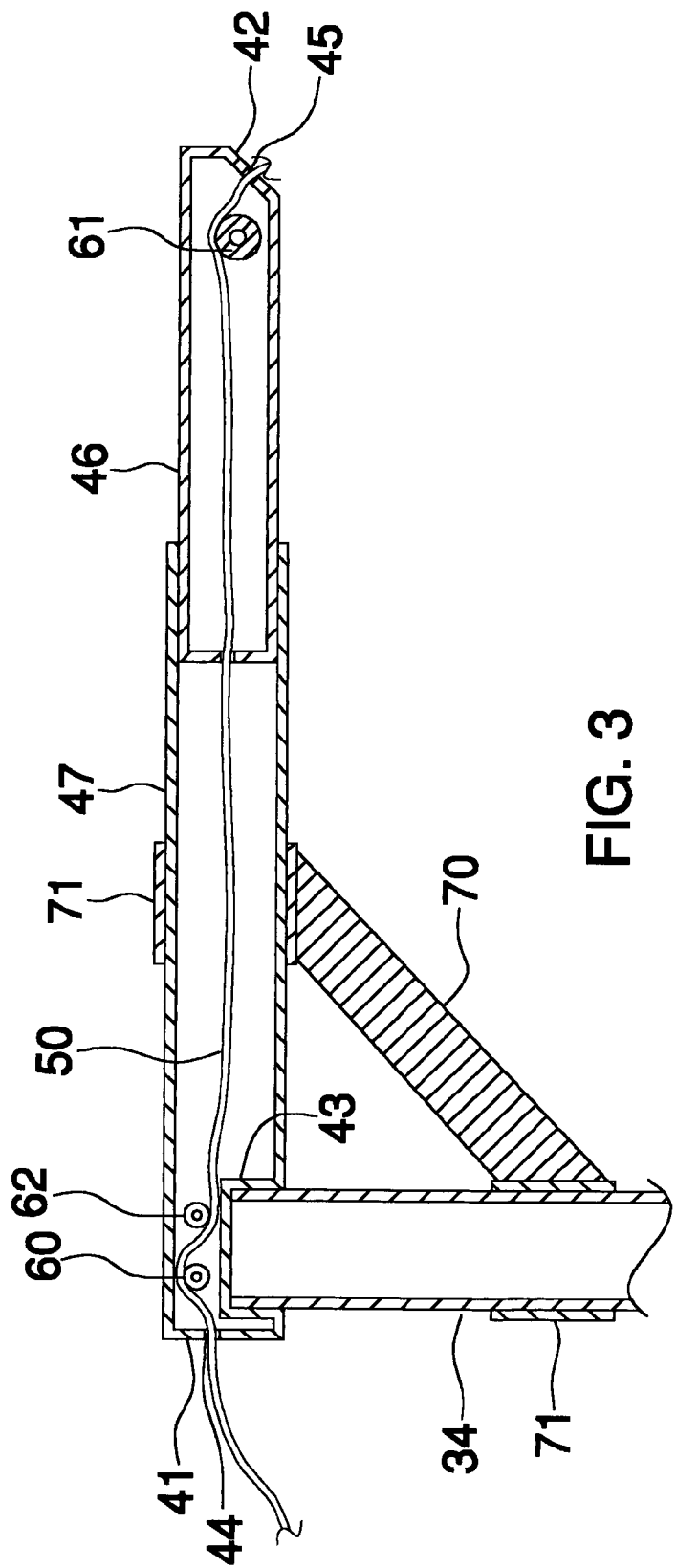
FIG. 3 is a cross sectional view taken along line 3—3 of FIG. 1 of the present invention.
Figure 4:
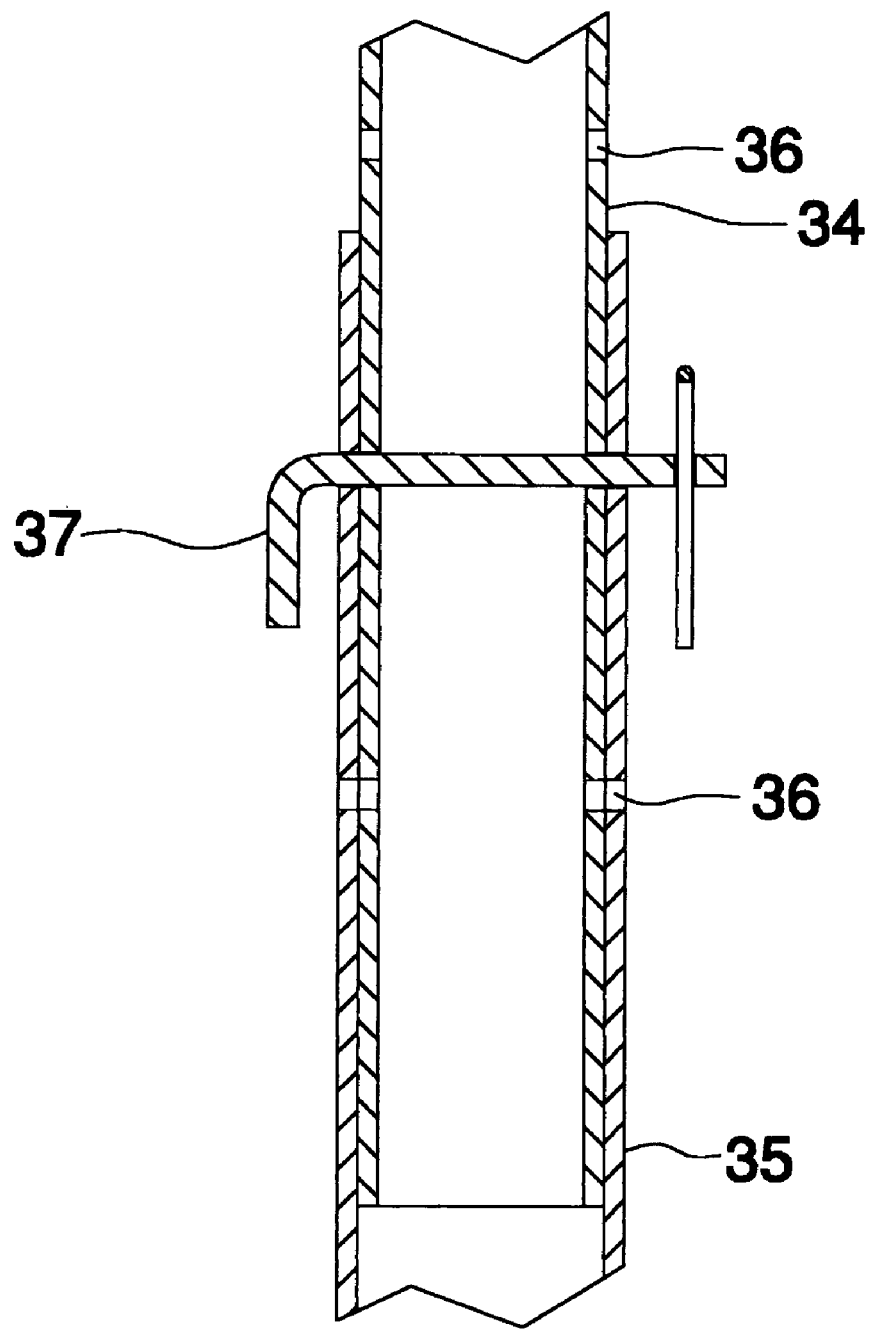
FIG. 4 is a cross-sectional view taken along line 4—4 of FIG. 2 of the present invention.
Figure 5:
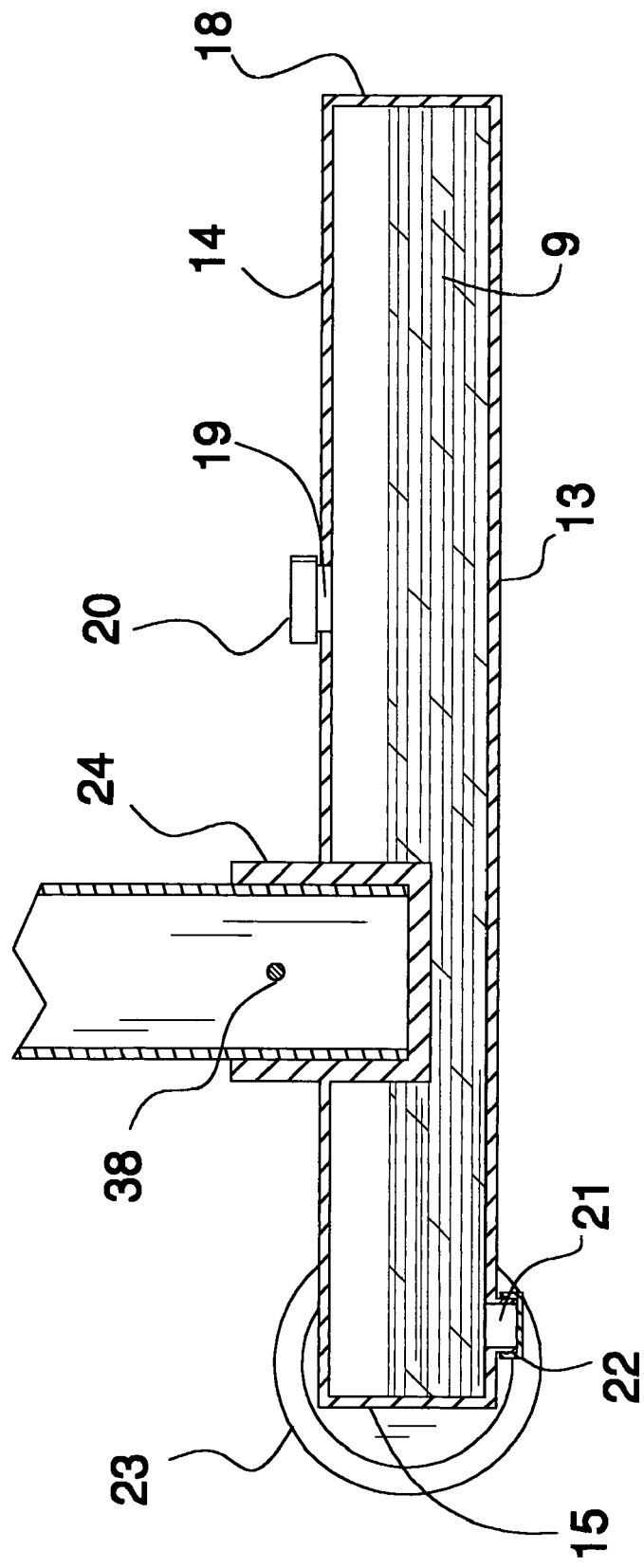
FIG. 5 is a cross-sectional view taken along line 5—5 of FIG. 1 of the present invention

An arm 40 has a first end 41 and a second end 42. The arm 40 is substantially hollow. The arm 40 has a wall 43 extending therein for selectively receiving the top end 32 of the pole such that the arm 40 is orientated generally perpendicular to the pole 30. The wall 43 is positioned nearer the first end 41 than the second end 42 of the arm 40. The arm 40 has a first orifice 44 and a second orifice 45 extending through a bottom side of the arm 40. The first orifice 44 is positioned between the wall 43 and the first end 41 of the arm 40 and the second orifice 45 is positioned adjacent to the second end 42 of the arm 40. The arm 40 is selectively telescopic and includes a first portion 46 removably extendable into a second portion 47. A support bracket 70 may have a pair of opposite ends having loop members 71 attached thereto. The loop members 71 are adapted for receiving the pole 30 and the arm 40. The support bracket is angled with respect to the loop members to accommodate the perpendicular angle between the pole 30 and the arm 40. FIG. 2 depicts the pole 30 and the arm 40 in both extended and retracted positions. The arm 40 also preferably has a rectangular cross-section.

A tether 50 has a pulling end 51 and a hanging end 52. The tether 50 extends through the arm 40 such that the hanging end 52 extends outwardly of the second orifice 45 and the pulling end 51 extends outwardly of the first orifice 44. A handle 53 is attached to the pulling end 51.

A first pulley 60 is rotatably mounted within the arm 40 and is positioned adjacent to the first orifice 44. A second pulley 61 is tolerably mounted within the arm 40 and is positioned adjacent to the second orifice 45. A third pulley 62 is rotatably mounted in the arm 40 and is positioned between the first 60 and second 61 pulleys. Each of the first 60, second 61 and third 62 pulleys has a rotational axis orientated generally perpendicular to a longitudinal use of the arm 40. The tether 50 may be extended over the first pulley 60, under the third pulley 62 and over the second pulley 61. The pulleys 60, 61, 62 prevent damage to the tether 50 from its rubbing against the edges of the orifices 43, 44 and also aid a user in moving the tether 50 through the arm 40.

In use, a fluid 9 may be positioned within the base 12 for providing added weight to the base 12. The fluid 9 may be removed for transporting of the assembly 10 but the added weight, when being used, supports the pole 30 and the arm 40. A piñata 8 may be selectively attached to the hanging end 52 of the tether 50 by tying it thereto. A person pulls on the handle 53 to cause the piñata 8 to move up and down while a child attempts to strike the piñata 8. The arm 40 and pole 30 are both telescoping to make the assembly 10 useful for a variety of sized children. By having the pole 30 extend into the sleeve 24 and the wall 43, the assembly 10 may be disassembled into relatively small components for its easy transportation. The wheels 23 allow for the movement of the assembly 10 without disassembling it.

With respect to the above description then, it is to be realized that the optimum dimensional relationships for the parts of the invention, to include variations in size, materials, shape, form, function and manner of operation assembly and use, are deemed readily apparent and obvious to one skilled in the art, and all equivalent relationships to those illustrated in the drawings and described in the specification are intended to be encompassed by the present invasion.

Therefore, the foregoing is considered as illustrative only of the principles of the invention. Further, since numerous modifications and changes will readily occur to those skilled in the art, it is not desired to limit the invention to the soon construction and operation shown and described, and accordingly, all suitable modifications and equivalents may be resorted to, falling within the scope of the invention.

I claim:

1. A portable piñata support device comprising:
   a base having a bottom wall, a top wall, a back wall, a first side wall, a second side wall and a front wall, said top wall having a fill opening extending therethrough into an interior of said base;
   a sleeve being mounted in said top wall;
   an elongated pole having a bottom end and a top end, said bottom end being removably extendable into said sleeve such that said pole is vertically orientated, said pole including a plurality of sections selectively retractable with respect to each other such that said pole is telescoping;
   an arm having a first end and a second end, said arm being substantially hollow, said arm having a well extending therein for selectively receiving said top end of said pole such that said arm is orientated generally perpendicular to said pole, said arm having a first orifice and a second orifice extending through a bottom side of said arm, said first orifice being positioned between said wall and said first end of said arm, said second orifice being positioned adjacent to said second end of said arm;
   a tether having a pulling end and a hanging end, said tether extending through said arm such that said hanging end extends outwardly of said second orifice and said pulling end extends outwardly of said first orifice;
   a first pulley being rotatably mounted within said arm and being positioned adjacent to said first orifice, a second pulley being rotatably mounted within said arm and being positioned adjacent to said second orifice, a third pulley being rotatably mounted in said arm and being positioned between said first and second pulleys, each of said first, second and third pulleys having a rotational axis orientated generally perpendicular to a longitudinal axis of said arm, wherein said tether is extended over said first pulley, under said third pulley and over said second pulley; and
   wherein a fluid is positioned within said base for providing added weight to said base and a piñata may be selectively attached to said hanging end of said tether.

2. The device according to claim 1, wherein said bottom wall has a drain opening extending therethrough, a drain plug being removably positioned over said drain opening.

3. The device according to claim 1, wherein said front wall is arcuate from said first side wall to said second side wall.

4. The device according to claim 1, further including a pair of wheels being rotatably mounted in said back wall and having an axis of rotation orientated parallel to a line extending along said back wall.

5. The device according to claim 4, wherein said sleeve is positioned between said first and second side walls and nearer said back wall than said front wall.

6. The device according to claim 1, wherein said sleeve is positioned between said first and second side walls and nearer said back wall than said front wall.

7. The device according to claim 1, wherein said plurality of sections includes a bottom section, a top section and a middle section, said top section being removably extendable into said middle section, said middle section being removably extendable into said bottom section, said bottom section having shorter height than said middle section, said middle section having a shorter height than said top section.

8. The device according to claim 7, wherein each of said sections has a plurality of holes extending therethrough, said holes in each of said sections being selectively alignable with holes in an adjacent one of said sections, a plurality of pins being removably extendable through aligned ones of said holes such that said pole is secured at a selected height.

9. The device according to claim 8, further including a fastener being removably extendable through an aperture in said sleeve and into said pole for releasably securing said pole in said sleeve.

10. The device according to claim 1, further including a fastener being removably extendable through an aperture in said sleeve and into said pole for releasably securing said pole in said sleeve.

11. The device according to claim 1, wherein said wall is positioned nearer said first end than said second end of said arm.

12. The device according to claim 1, wherein said arm is selectively telescopic and including a first portion removably extendable into a second portion.

13. A portable piñata support device comprising:

a base having a bottom wall, a top wall, a back wall, a first side wall, a second side wall and a front wall, said top wall having a fill opening extending therethrough into an interior of said base, a cover being removably positioned over said fill opening, said bottom wall having a drain opening extending therethrough, a drain plug being removably positioned over said drain opening, said front wall being arcuate from said first side wall to said second side wall, said base comprising a plastic material;

a pair of wheels being rotatably mounted in said back wall and having an axis of rotation orientated parallel to a line extending along said back wall;

a sleeve being mounted in said top wall, said sleeve having an aperture extending therethrough, said sleeve being positioned between said first and second side walls and nearer said back wall than said front wall;

an elongated pole having a bottom end and a top end, said bottom end being removably extendable into said sleeve such that said pole is vertically orientated, said pole including a plurality of sections selectively retractable with respect to each other such that said pole is telescoping, said plurality of sections at least including a bottom section, a top section and a middle section, said top section being removably extendable into said middle section, said middle section being removably extendable into said bottom section, said bottom section having shorter height than said middle section, said middle section having a shorter height than said top section, each of said sections having a plurality of holes extending therethrough, said holes in each of said sections being selectively alignable with holes in an adjacent one of said sections, a plurality of pins being removably extendable through aligned ones of said holes such that said pole is secured at a selected height, said pole having a substantially rectangular cross-section taken transversely to a longitudinal axis of said pole;

a fastener being removably extendable through said aperture and into said pole for releasably securing said pole in said sleeve;

an arm having a first end and a second end, said arm being substantially hollow, said arm having a wall extending therein for selectively receiving said top end of said pole such that said arm is orientated generally perpendicular to said pole, said wall being positioned nearer said first end than said second end of said arm, said arm having a first orifice and a second orifice extending through a bottom side of said arm, said first orifice being positioned between said wall and said first and of said arm, said second orifice being positioned adjacent to said second end of said arm, said arm being selectively telescopic and including a first portion removably extendable into a second portion;

a tether having a pulling end and a hanging end, said tether extending through said arm such that said hanging end extends outwardly or said second orifice and said pulling end extends outwardly of said first orifice a handle being attached to said pulling end;

a first pulley being rotatably mounted within said arm and being positioned adjacent to said first orifice, a second pulley being rotatably mounted within said arm and being positioned adjacent to said second orifice, a third pulley being rotatably mounted in said arm and being positioned between said first and second pulleys, each of said first, second and third pulleys having a rotational axis orientated generally, perpendicular to a longitudinal axis of said arm, wherein said tether may be extended over said first pulley, under said third pulley and over said second pulley; and wherein a fluid may be positioned within said base for providing added weight to said base and a piñata may be selectively attached to said hanging end of said tether.

\* \* \* \* \*